Figure 1:
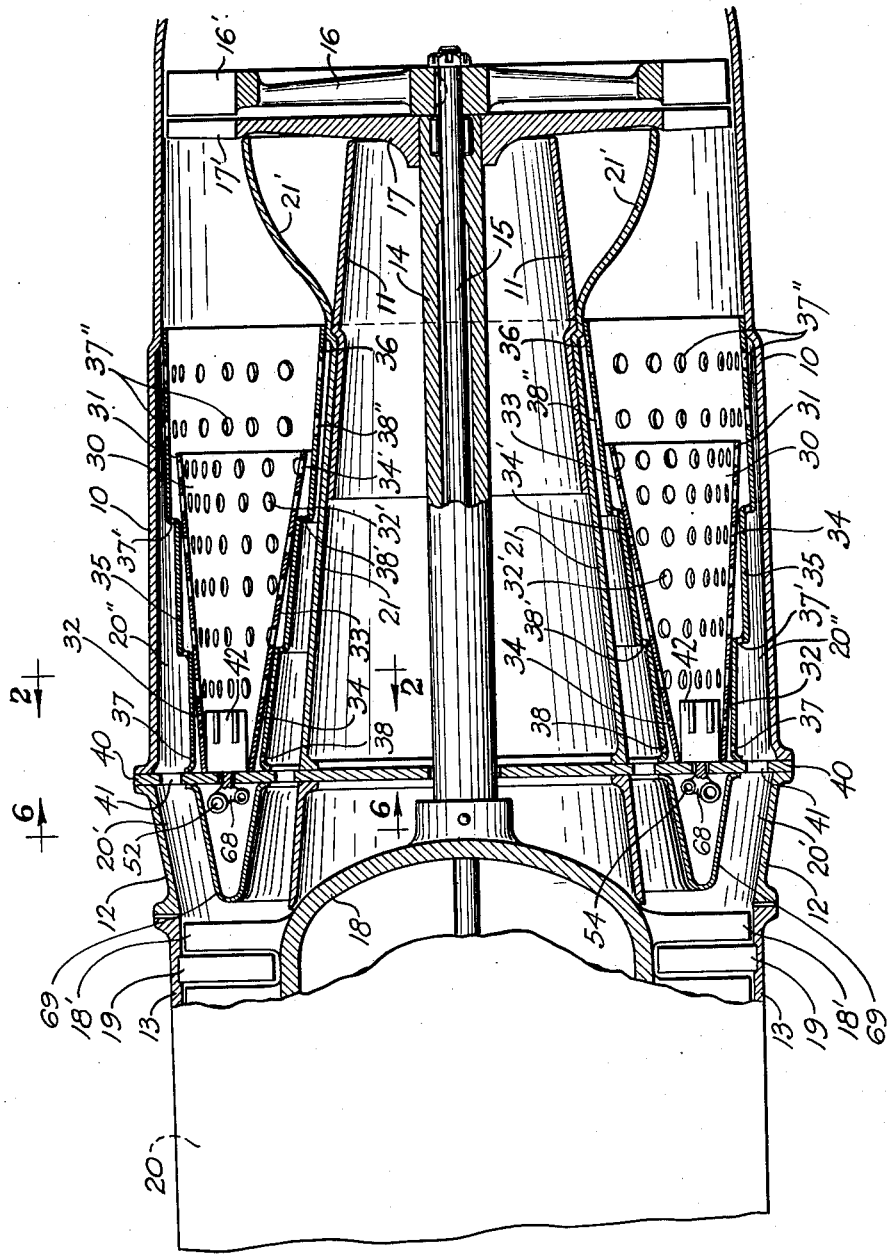

INVENTOR.
FRANK C. MOCK.
BY
ATTORNEY.

INVENTOR.
FRANK C. MOCK.
BY
ATTORNEY.

Nov. 4, 1952            F. C. MOCK         2,616,258
JET ENGINE COMBUSTION APPARATUS, INCLUDING
PILOT BURNER FOR IGNITION AND VAPORIZATION
OF MAIN FUEL SUPPLY

Filed Jan. 9, 1946                                3 Sheets-Sheet 3

INVENTOR.
FRANK C. MOCK.
BY
ATTORNEY.

Patented Nov. 4, 1952

2,616,258

UNITED STATES PATENT OFFICE 2,616,258

JET ENGINE COMBUSTION APPARATUS, INCLUDING PILOT BURNER FOR IGNITION AND VAPORIZATION OF MAIN FUEL SUPPLY

Frank C. Mock, South Bend, Ind., assignor to Bendix Aviation Corporation, South Bend, Ind., a corporation of Delaware Application January 9, 1946, Serial No. 640,019

8 Claims. (Cl. 60—39.65)

This invention relates to burners, and particularly to burners wherein a fuel, either gaseous, liquid or powdered solid fuel, is injected into and burned in a moving column of air. The invention is particularly adapted for, but not limited to, use in aircraft power plants of the gas turbine and jet propulsion types wherein air is compressed into a chamber constituting part of a generator, at which point it is heated by the combustion of fuel and the expanded air and products of combustion discharged through a gas turbine for driving an air compressor and/or a propeller, after which the gases may be discharged through a reaction tube to propel the aircraft or to assist the propeller in propelling the aircraft.

When a burner constituting part of such power plants is in operation, the rate of fuel feed thereto is frequently varied from an idling rate producing a low burner flame to a high rate producing an intense or hot flame, and is subjected to other conditions which render it extremely difficult to maintain stable operation of the burner. Among the problems encountered are, excess fuel consumption; difficulty in obtaining effective vaporization of the fuel supplied to the burner at low fuel feeds and at the time the rate of feed is increased in order that there will be smooth and rapid flame propagation when an engine embodying the burner is accelerated from an idling or low power condition to a high power condition; difficulty in starting; and the tendency of the burner flame to go out or fail at low fuel feeds and high air flow conditions. It is extremely desirable that the burner ignite or start quickly and easily under all conditions of air flow, both at the start of the flight and during the flight of an aircraft. If there is delay in igniting the burner, or on the other hand if the fuel fails to vaporize properly at low fuel feeds and during the acceleration period, excess fuel accumulates in the breech or muffle portion of the burner tube, and then when the burner does start or the rate of fuel feed is suddenly increased for quick acceleration, there is an intense flame or heat produced while the unvaporized or accumulated fuel is burning which tends to damage or cause rapid deterioration of parts in the region of the burner flame, and there is also a waste of fuel which is a very important factor in aircraft power plants.

The invention therefore includes among its objects:

To provide a burner or heat generator particularly but not necessarily adapted for power plants of the type specified having means which will ensure or facilitate maximum vaporization of the fuel fed to the burner under varying conditions of operation;

To reduce fuel consumption;

To provide a burner or heat generator wherein starting is facilitated and which after starting will be in a condition whereby the burner will respond smoothly and quickly to an increase in the rate of fuel feed with a minimum of average fuel consumption;

To provide a burner or heat generator of the type specified wherein the burner flame is protected against failure and which protecting means also facilitates effective vaporization of the fuel fed to the burner;

More specifically, to provide a burner and coordinated fuel feeding system whereby a pilot flame capable of being maintained at a low rate of fuel consumption acts to heat fuel vaporizing surfaces and maintain the latter in a highly effective vaporizing condition so that the burner flame will propagate smoothly when there is a sudden increase in fuel feed to accelerate the engine from a low to a high power condition;

To reduce or prevent overheating of fuel nozzles and adjacent parts; and

To generally improve and render more efficient burners of the type specified.

Figure 2:
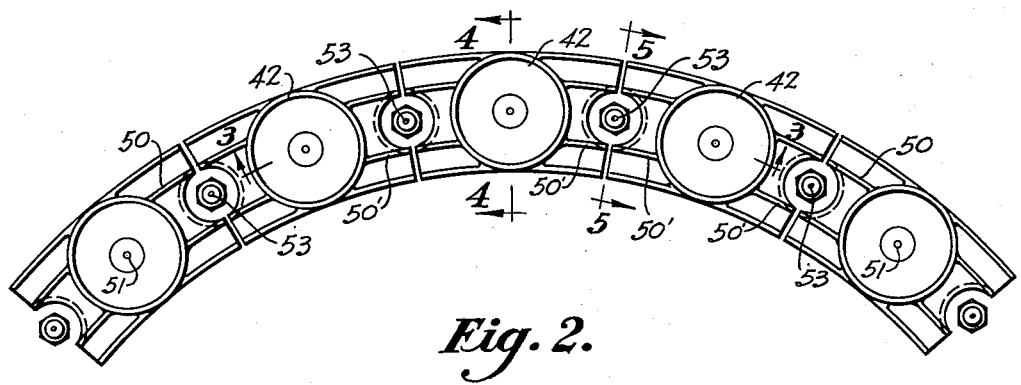
Figure 3:
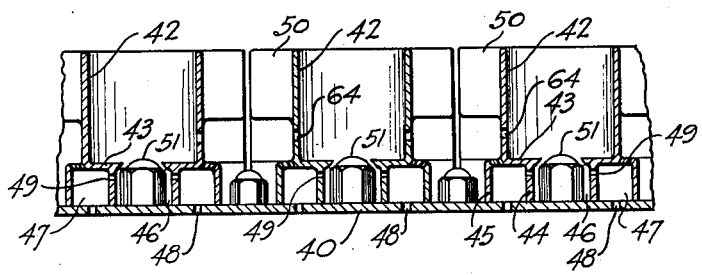
Figure 4:
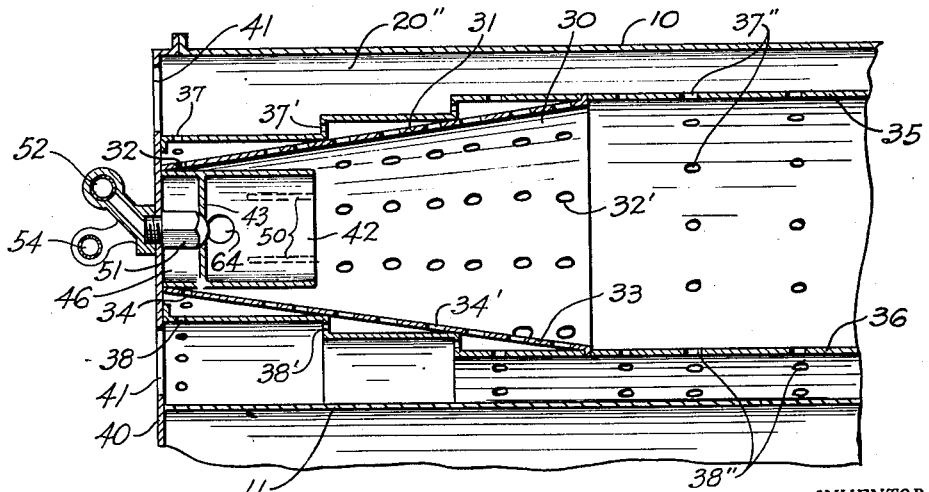
Figure 6:
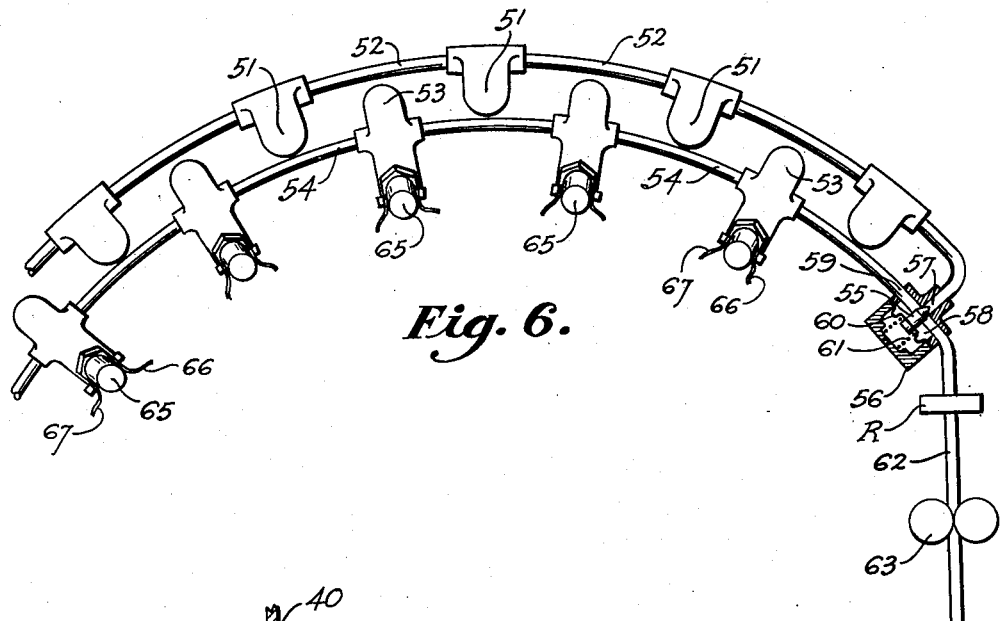
Figure 5:
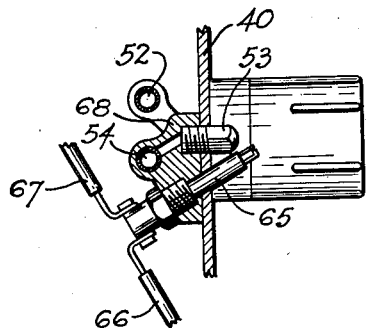

The foregoing and other objects and advantages will become apparent in view of the following description taken in conjunction with the drawings, wherein:

Figure 1 is a substantially central longitudinal sectional view of a gas turbine or jet engine embodying the features of the invention;

Figure 2, a section taken substantially on a line 2—2, Figure 1;

Figures 3, 4 and 5, sectional views taken substantially on the lines 3—3, 4—4 and 5—5, Figure 2; and Figure 6, a view in end elevation taken on the line 6—6, Figure 1, particularly showing the fuel feeding system for the pilot nozzles and main burner nozzles.

Referring first to Figure 1, the power plant adopted for illustration purposes consists of a turbo-jet engine of the axial-flow compressor type having an outer sheath or casing 10 and an inner cone-shaped sheath or casing 11, which are assembled in annular radially-spaced relation to a diffuser 12 formed with rear flanged portions which may be secured as by welding or other suitable means to the contiguous flanged edges of the said casings. At its front or air intake end the diffuser 12 is connected to a front outer casing 13 which extends forwardly and may be shaped to define the nose cowling or air intake section of the engine, not shown. Fixed centrally of the cone 11 is an elongated bearing section 14 rotatably mounting a drive shaft 15. At its rear or right hand end, the shaft 15 has secured thereon a turbine wheel 16 having peripheral blades 16', and inwardly or to the left of the turbine wheel 16 is a supporting member 17 which is secured at its axis to the bearing 14 and at its periphery and inwardly therefrom is anchored to the cone 11 and terminates radially in diffuser blades 17' which tend to diffuse and guide the air and products of combustion passing to the turbine blades 16'. At its forward or left-hand extremity, the shaft 15 has secured thereon a compressor body 18 which carries a plurality of sets of radially-projecting blades 18'. Projecting radially inwardly from the casing 13 are alternate sets of reaction blades 19, there usually being a plurality of sets of movable compressor blades and stationary reaction blades in compressors of the axial flow type. The compressed body 18 and casing 13 define an annular air-inlet passage 20 which directs air to the compressor where it is acted on by the compressor blades and the air compressed in an annular passage 20' defined by the diffuser 12 and thence into passage 20'' defined by the outer shell 10 and an inner shell 21, from whence it flows to the burner in a manner to be described. At its discharge end, the passage 20' is restricted by a flared portion 21' of the shell 21.

The burner assembly comprises a muffle section or breech chamber 30 defined by an outer annular shell 31 formed with a series of air-inlet holes 32, 32' and an inner annular shell 33 formed with a series of air-inlet holes 34, 34'. The shells or casings 31 and 33 are preferably cone-shaped and enclosed by an outer annular jacket 35 and an inner annular jacket 36 of progressively stepped formation in the direction of air flow, the outer jacket being formed with calibrated air-inlet holes 37, 37', 37'' and the inner jacket being formed with similar holes 38, 38', 38''. The shells 31 and 33 and jackets 35 and 36 may be made in half-sections and edge-joined at an intermediate point, or fabricated in any other suitable manner to facilitate assembly.

At the breech of the burner, the inner and outer shells 31 and 33 and jackets 35 and 36 have their end edges secured to a supporting or backing plate 40, note Figure 4, provided with openings 41 through which air passes into the chamber 20'', the plate 40 being in the form of an annulus or ring anchored to the diffuser 12.

In the breech chamber 30, or more specifically in the entrance end of said chamber, are a series of cups 42 arranged in annular formation, note particularly Figures 2, 3, and 4, said cups being each provided with a transverse wall 43 at its base and outer and inner annular base walls 44 and 45 defining a central nozzle chamber 46 and an outer chamber 47 surrounding said nozzle chamber. Air is admitted to the chamber 47 by means of calibrated air inlet holes 48 at which point its velocity is reduced and from which chamber it may pass to chamber 46 through holes 49, note particularly Figure 3, and thence outwardly into the cup 42 through clearance space provided around the main nozzle tip. The cups 42 are also formed with heat conducting means in the form of ribs 50, 50' for a purpose to be described. Within the chamber 46 of each cup 42 is a main fuel nozzle 51 having its discharge tip seated in an opening formed in the base wall 43. These nozzles are preferably of a type adapted to discharge fuel in a cone shaped spray such as the nozzle illustrated in my co-pending application Serial No. 640,018 filed of even date herewith, and are supplied with fuel through a conduit 52, note Figure 6. Between the cups 42 and the laterally-projecting ribs 50 and 50' thereof are a series of relatively small low-pressure pilot nozzles 53 adapted to be supplied with fuel through a conduit 54. The delivery pressure of fuel in the conduits 52 and 54 is controlled by a valve 55 which is mounted in a housing 56 and controls a port 57 leading from valve chamber 58 to the conduit 52. A calibrated port 59 communicates the chamber 58 with the conduit 54. The valve 55 is carried by a diaphragm 60 backed by spring 61, said diaphragm forming the movable wall of chamber 58 which is supplied with fuel under pressure through a conduit 62 having a fuel pump 63, or analogous fuel pressuring means driven in relation to engine speed, mounted therein and a suitable fuel-metering device or regulator R. As long as the pressure of fuel in chamber 58 remains below a certain value, it will by-pass the valve 55 and flow only through the port 59 into the conduit 54 to supply the pilot nozzles 53; but when the pressure exceeds such value, it acts on the diaphragm 60 and opens the valve 55, whereupon fuel under pressure is also supplied to the nozzles 51 through the conduit 52.

If desired, the valve 55 may be of the two-way or double-acting type and arranged to control the port 59 in conjunction with the port 57 in a manner such that when the main fuel nozzles are active or become ignited, flow of fuel to the pilot nozzles will be cut off. This action could also be accomplished by a thermostatically-controlled valve having an element thermally related to the main or pilot nozzles or both.

The pilot nozzles 53 may also be of the conical spray type and not only discharge fuel spray toward the ribs 50, 50' but also toward the cup walls 42 and through holes or openings 64, note Figure 3, into the chambers defined by the cups 42. Adjacent each of the pilot nozzles 53 or any selected number thereof is a suitable ignition device such as a spark plug 65, note Figure 5, which may be supplied with current through wires 66 and 67 forming part of an ignition circuit.

The fuel lines 52 and 54 are shown mounted in brackets 68 carried by the backing plate 40. Suitable fairing 69 is located in advance of the brackets and fuel lines to reduce resistance to the flow of air through the passage 20'.

The operation in general is as follows:

Fuel under pressure supplied by way of fuel line 62 flows into valve chamber 58 and thence through port 59 to the pilot nozzles 53 as previously described. These pilot nozzles may be of a relatively small size delivering, for example, from four to twelve percent of the maximum amount of fuel used. To start or re-start the burner, the spark plugs are energized to ignite the spray issuing from the pilot nozzles 53. Normally, the pilot nozzles remain ignited at all fuel flows, or as long as the burner is in operation. The relatively small flame from the pilot nozzles contacts the ribs or fins 50, 50' and also the adjacent walls of the cups 42, and thus the latter are heated both by conduction and radiation.

As soon as the pressure in the valve chamber 58 exceeds a predetermined value, the valve 55 opens and fuel is supplied to the nozzles 51; and since the pilot flame is continually playing in the spray region of these nozzles through the holes 64, the main fuel spray will be quickly ignited and will propagate outwardly into the muffle chamber 30.

Compressed air entering the passage 20" is admitted to the breech chamber at graduated velocities, with the strata of air at lowest velocity in the immediate region of the cups 42. By properly calibrating the openings 37, 37', 37" and 38, 38', 38" in the stepped outer and inner sheathing 35 and 36 with respect to the openings 32, 32' and 34, 34' in the outer and inner muffle walls 31 and 33, a velocity of, for example, 15 feet per second may be obtained on the air entering in the immediate region of the cups, a velocity of say 40 feet per second just beyond the cups, and increasingly higher velocities progressively outwardly of the combustion chamber. Thus the burner flame when at a relatively low value is protected from failure by high air velocities or a sudden increase in air flowing to the burner. Such conditions in a jet or gas turbine engine are present when the fuel supply to the delivery nozzles is cut sharply to decelerate from a high to a lower power output, at which time the momentum of the engine maintains momentarily a relatively high air flow through the passages 20, 20', 20".

The fuel spray issuing from the main nozzles tends to cool the surrounding walls and any other parts with which it contacts, and this is particularly true under high fuel delivery pressures and correspondingly high air flows, since at such times the flame is being propagated well outwardly beyond the breech portion of the combustion chamber and has the appearance of becoming detached from the nozzle. While controlled velocities in the region of the burner cups tend to prevent this cooling action due to more effective combustion, yet the high pressure delivery to which the main nozzles must respond may leave a certain amount of relatively cool fuel spray in the immediate zone of the nozzles. However, the pilot nozzles overcome any cooling effect which may result from high pressure delivery from the main nozzles 51, since the air flow in the region of these pilot nozzles is gauged for efficient combustion of the fuel issuing therefrom. Hence the pilot flame burns with a maximum of combustion efficiency and continually plays within the area bonded by the ribs 50, 50' and adjacent walls of the cups 42, thereby maintaining these walls in a controlled heated state such as will effect maximum vaporization of the fuel spray impinging thereagainst under all conditions of fuel delivery.

Air passes in through the holes 48 in the backing plate 40 and into the chambers 47 where its velocity is reduced and from which it flows through the openings 49 and outwardly around the tips of the spray nozzles 51. The holes 48 and 49 may be calibrated to control this air flow in a manner such as to prevent overheating of the nozzles and to also reduce the tendency toward carbon formation on the tips thereof.

It will be understood that once those skilled in the art have been taught the theory of operation of the improved burner and the results obtained thereby, such results may be obtained by various modifications and rearrangements of parts other than those specifically enumerated herein. Hence no attempt has been made to describe all the advantageous features of the invention or the modifications which may be made in order to carry out or produce such advantages, the scope of the invention being limited only by the appended claims.

I claim:

1. A burner or heat generator having walls defining an elongated burner chamber provided with a breech potrion at one extremity and an open discharge end at the opposite extremity, a main fuel spray nozzle arranged to discharge fuel under pressure into the breech portion substantially axially of the chamber, a substantially cup-shaped flame shield surrounding the nozzle and projecting forwardly thereof, heat conducting members adapted to conduct heat to said shield, an auxiliary or pilot nozzle arranged to project a pilot flame in heating relation to said conducting members to heat the walls of said shield and provide a fuel vaporizing surface for unvaporized fuel discharged from said main nozzle, means for admitting air at controlled velocities to said chamber, ignition means operatively associated with said auxiliary or pilot nozzle, and means for supplying fuel to said nozzles, said fuel supply means being automatically operative to supply fuel to said auxiliary or pilot nozzle at pressures below a predetermined value and to said main nozzle at pressures above said value.

2. A burner or heat generator having walls defining an elongated burner chamber provided with a breech or muffle portion at one extremity and an open discharge end at its opposite extremity, a main fuel spray nozzle arranged to discharge fuel under pressure into said breech portion substantially axially of the chamber, a generally cup-shaped flame shield for the nozzle, a pilot nozzle arranged to project a pilot flame externally of and adjacent to said shield, said shield being provided with an opening through which the pilot flame may pass to ignite the fuel issuing from said main nozzle, the pilot flame also functioning to heat the walls of the shield and provide a vaporizing surface for any unvaporized fuel discharged from the main nozzle, means for supplying air to said chamber for admixture with the fuel, and ignition means arranged in operative relation to said pilot nozzle.

3. A burner or heat generator having walls defining an elongated burner chamber provided with a breech or muffle portion at one extremity and an open discharge end at the opposite extremity, a plurality of main fuel spray nozzles arranged to discharge fuel under pressure into the breech portion substantially axially of the chamber, a substantially cup-shaped flame shield for each of the main nozzles, a pilot nozzle disposed between adjacent shields externally thereof and adapted to project a pilot flame in heating relation to the walls of the shields, said shields being provided with heat conducting members also adapted to be heated by the pilot flame and conduct heat to the shield, and means for supplying air to said chamber for admixture with the fuel.

4. A burner or heat generator having walls defining an elongated burner chamber provided with a breech or muffle portion at one extremity and an open discharge end at the opposite extremity, a plurality of main fuel discharge nozzles arranged to discharge fuel into said breech portion, a flame shield for each of said nozzles, each of said flame shields being generally in the form of a cup having walls defining a cup chamber and a base or transverse end wall in which the nozzle tip is seated, the walls of the cup externally thereof being provided with ribs or heat conducting fins, a pilot nozzle disposed between adjacent cups and adapted to project a pilot flame in heating relation to the walls of the cups and said ribs, each of said cups being provided with an opening in the base or transverse end wall thereof through which the pilot flame projects to ignite the fuel from said main nozzles, ignition means coacting with said pilot nozzles, and means for supplying air to said chamber for admixture with the fuel.

5. A burner or heat generator having walls defining an elongated burner chamber provided with a breech or muffle portion at one extremity and an open discharge end at the opposite extremity, a plurality of main fuel discharge nozzles arranged to discharge fuel into said breech portion, a flame shield for each of said nozzles, each of said flame shields being generally in the form of a cup having walls defining a cup chamber and a base or transverse end wall in which the nozzle tip is seated, the walls of the cup externally thereof being provided with heat conducting ribs or fins, a pilot nozzle disposed between adjacent cups and adapted to project a pilot flame in heating relation to the walls of the cups and said ribs, each of said cups being provided with an opening in the base or transverse end wall thereof through which the pilot flame of the coacting pilot nozzle projects to ignite the fuel from the adjacent main nozzles, ignition means coacting with said pilot nozzles, and means for supplying air to said chamber for admixture with the fuel, each of said cups being also provided with annular spaced walls defining a chamber surrounding the main nozzle and an air chamber surrounding said nozzle chamber, the walls of said air chamber and nozzle chamber being provided with calibrated air inlet openings for admitting a cooling draught of air to the nozzle chamber.

6. A burner including outer spaced walls defining an air passage for a supply of air under pressure, spaced heat-resistant walls located within and spaced from said outer walls and defining a combustion chamber having a breech or muffle portion at one extremity thereof and an open discharge end at the opposite extremity, said chamber walls being provided with a series of calibrated air inlet openings of increasing capacity from the breech toward the discharge end of the combustion chamber, a jacket enclosing at least the breech portion of the burner walls, said jacket being spaced from the burner walls and also provided with air inlet openings so calibrated with respect to the openings in the burner walls as to admit air to the burner chamber at controlled velocities.

7. A burner including outer spaced walls defining an air passage for a supply of air under pressure, spaced heat-resistant walls located within and spaced from said outer walls and defining a combustion chamber having a breech or muffle portion at one extremity thereof and an open discharge end, said chamber walls being provided with a series of calibrated air inlet openings of progressively-increasing capacity from the breech toward the discharge end of the combustion chamber, a jacket enclosing at least the breech portion of the burner walls, said jacket being provided with one or more radially stepped shoulders, the jacket walls being also provided with air-inlet openings so calibrated with respect to the openings in the burner walls as to admit air to the burner chamber at graduated velocities from the breech to the discharge end of said chamber.

8. A burner for gas turbine engines having walls defining a burner or combustion chamber of generally elongated contour with a breech portion at one extremity thereof and an open discharge end at its opposite extremity, a main fuel nozzle located to discharge a generally conical spray of fuel outwardly into said breech portion, a flame shield having an open end through which the nozzle discharges and side walls substantially surrounding the region of the nozzle spray, heat conductors connected to and projecting laterally from said walls, and an auxiliary or pilot nozzle located in heating adjacency to said conductor and shield to effect heating of said walls while the burner is in operation, said heated walls providing a vaporizing surface for any unvaporized fuel discharged from said main nozzle.

FRANK C. MOCK.

REFERENCES CITED

The following references are of record in the file of this patent:

UNITED STATES PATENTS

| Number | Name | Date |
|---|---|---|
| 944,975 | Sodeau | Dec. 28, 1909 |
| 980,801 | Kraus | Jan. 3, 1911 |
| 1,392,948 | Kraus | Oct. 11, 1921 |
| 1,988,456 | Lysholm | Jan. 22, 1935 |
| 2,072,731 | Crosby | Mar. 2, 1937 |
| 2,080,425 | Lysholm | May 18, 1937 |
| 2,173,333 | Jacobs | Sept. 19, 1939 |
| 2,184,967 | Winter | Dec. 26, 1939 |
| 2,196,282 | Voorheis | Apr. 9, 1940 |
| 2,399,046 | Larrecq | Apr. 23, 1946 |
| 2,404,335 | Whittle | July 16, 1946 |